United States Patent
Kim et al.

(10) Patent No.: US 10,490,894 B2
(45) Date of Patent: Nov. 26, 2019

(54) MULTI-DRIVE APPARATUS FOR PHASE SHIFTERS

(71) Applicant: ACE TECHNOLOGIES CORPORATION, Incheon (KR)

(72) Inventors: Byung Hwan Kim, Incheon (KR); Seung Yong Lee, Bucheon-si (KR); Gun Seok Oh, Goyang-si (KR); Shin Gyo Han, Anyang-si (KR); Jung Wook Lee, Gimpo-si (KR)

(73) Assignee: ACE TECHNOLOGIES CORPORATION, Incheon (KR)

( * ) Notice: Subject to any disclaimer, the term of this patent is extended or adjusted under 35 U.S.C. 154(b) by 427 days.

(21) Appl. No.: 15/628,491

(22) Filed: Jun. 20, 2017

(65) Prior Publication Data
US 2017/0373392 A1  Dec. 28, 2017

(30) Foreign Application Priority Data

Jun. 22, 2016  (KR) .................. 10-2016-0077796

(51) Int. Cl.
| | |
|---|---|
| *F16H 1/20* | (2006.01) |
| *H01Q 3/32* | (2006.01) |
| *F16H 1/22* | (2006.01) |
| *H01Q 1/12* | (2006.01) |
| *H01Q 21/20* | (2006.01) |
| *H01Q 3/30* | (2006.01) |

(52) U.S. Cl.
CPC .................. *H01Q 3/32* (2013.01); *F16H 1/22* (2013.01); *H01Q 1/125* (2013.01); *H01Q 21/20* (2013.01); *H01Q 1/12* (2013.01); *H01Q 3/30* (2013.01)

(58) Field of Classification Search
CPC . F16H 1/22; H01Q 1/12; H01Q 1/125; H01Q 21/20; H01Q 3/30; H01Q 3/32
See application file for complete search history.

(56) References Cited

U.S. PATENT DOCUMENTS

2004/0242365 A1* 12/2004 Uebbing ............. F16H 37/0833
 475/214
2011/0303035 A1* 12/2011 Niebergall ........... B60K 17/043
 74/414

FOREIGN PATENT DOCUMENTS

| DE | 10-2011-009600 B3 | 3/2012 |
|---|---|---|
| KR | 10-0774262 B1 | 11/2007 |
| KR | 10-2010-0117838 A | 11/2010 |
| KR | 10-2013-0036943 A | 4/2013 |

(Continued)

OTHER PUBLICATIONS

Office Action from Vietnamese Patent Application No. 1-2017-01832 dated Apr. 25, 2019.

*Primary Examiner* — Muhammad S Islam

(57) ABSTRACT

A multi-drive apparatus for phase shifters is disclosed. The disclosed multi-drive apparatus for phase shifters includes: a main-axle gear; a multiple number of output shafts each connected to a phase shifter; a multiple number of output gears coupled with the output shafts; and a cam part having the output shafts arranged on its upper surface, where at least one recess is formed in the upper surface of the cam part, and when at least one of the output shafts is inserted into the recess according to a movement of the cam part, then an output gear coupled with the output shaft inserted into the recess engages the main-axle gear. With the disclosed multi-drive apparatus, it is possible to drive multiple phase shifters using just two motors.

11 Claims, 7 Drawing Sheets

(56) References Cited

FOREIGN PATENT DOCUMENTS

| KR | 10-2014-0017530 A | 2/2014 |
| KR | 10-1600832 B | 3/2016 |
| KR | 10-1600832 B1 | 3/2016 |

* cited by examiner

US 10,490,894 B2

MULTI-DRIVE APPARATUS FOR PHASE SHIFTERS

CROSS-REFERENCE TO RELATED APPLICATIONS

This application claims the benefit of Korean Patent Application No. 10-2016-0077796, filed with the Korean Intellectual Property Office on Jun. 22, 2016, the disclosure of which is incorporated herein by reference in its entirety.

BACKGROUND

1. Technical Field

The present invention relates to a multi-drive apparatus, more particularly to a multi-drive apparatus for phase shifters.

2. Description of the Related Art

In an antenna that uses multiple radiators, for example a base station antenna, circumstances may occur in which a feed signal of a different phase must be supplied to each of the radiators. In such cases, phase shifters can be employed to supply feed signals of different phases to the respective radiators, but if a large number of radiators are used, a large number of phase shifters may be needed, and in order to drive a large number of phase shifters, a large number of motors may be needed to operate each of the phase shifters. Since a motor occupies a considerable amount of space, mounting all of the motors for driving the phase shifters into an antenna would result in an excessively large volume of the antenna and a complicated structure for the driving apparatus.

SUMMARY OF THE INVENTION

To resolve the problem in the related art described above, an aspect of the invention aims to provide a multi-drive apparatus for phase shifters that can drive a multiple number of phase shifters with just two motors.

To achieve the objective above, an embodiment of the invention provides a multi-drive apparatus for phase shifters that includes: a main-axle gear; a multiple number of output shafts each connected to a phase shifter; a multiple number of output gears coupled with the output shafts; and a cam part having the output shafts arranged on its upper surface, where at least one recess is formed in the upper surface of the cam part, and when at least one of the output shafts is inserted into the recess according to a movement of the cam part, then an output gear coupled with the output shaft inserted into the recess engages the main-axle gear.

The multi-drive apparatus for phase shifters can further include a first support part that is positioned above the output gears, a second support part can be formed on each of the output shafts, elastic elements can be mounted on the output shafts between the first support part and the second support parts, and the elastic elements can be mounted in a compressed state so as to provide elastic forces by which each output shaft can be inserted into the recess when they are positioned over the recess.

The recess can include an inclined portion, so that when an output shaft is inserted into or retracted from the recess, then the output shaft can be smoothly inserted or retracted by way of the inclined portion.

The multi-drive apparatus for phase shifters can further include an input shaft that penetrates through the cam part, where the main-axle gear can be coupled with the input shaft such that the main-axle gear rotates in accordance with a rotation of the input shaft.

To minimize friction, the distal end of an output shaft contacting the cam part can have a spherical shape.

The rotation of the main-axle gear can cause the engaged output gear to rotate accordingly, and the corresponding output shaft can rotate in response to the rotation of the output gear, resulting in the phase shifter to which the output shaft is connected performing a phase change according to the rotation of the output shaft.

The output gears can all engage the main-axle gear when the output gears and the main-axle gear are arranged on the same plane.

Conversely, none of the output gears may engage the main-axle gear when the output gears are arranged on the same plane but the main-axle gear is not arranged on the same plane as the output gears.

If at least one of the output shafts is positioned over the recess but is not engaged with the main-axle gear, an elastic member mounted on the corresponding output shaft positioned over the recess can provide an elastic force continuously to enable the output shaft to engage the main-axle gear.

The multi-drive apparatus for phase shifters can further include driven axles that are configured to drive the phase shifters respectively. The output shafts can be inserted in the driven axles respectively, with the output shafts having polygonal cross-sections at the distal ends that are inserted into the driven axles, and the driven axle can be driven by the rotation of the output shaft.

The multi-drive apparatus for phase shifters can further include a shaft nut mounted inside the driven axle, where the shaft nut can be configured to receive the output shaft inserted therein, and the shaft nut can have at least one protrusion formed inside. The shaft nut can undergo a translational motion according to the rotation of the output shaft, and if the shaft nut contacts the at least one protrusion as the output shaft rotates in one direction, then the output shaft may be prevented from further rotating in said one direction.

An embodiment of the invention provides the advantage that multiple phase shifters can be driven with just two motors.

Additional aspects and advantages of the present invention will be set forth in part in the description which follows, and in part will be obvious from the description, or may be learned by practice of the invention.

DETAILED DESCRIPTION OF THE INVENTION

Figure 1:
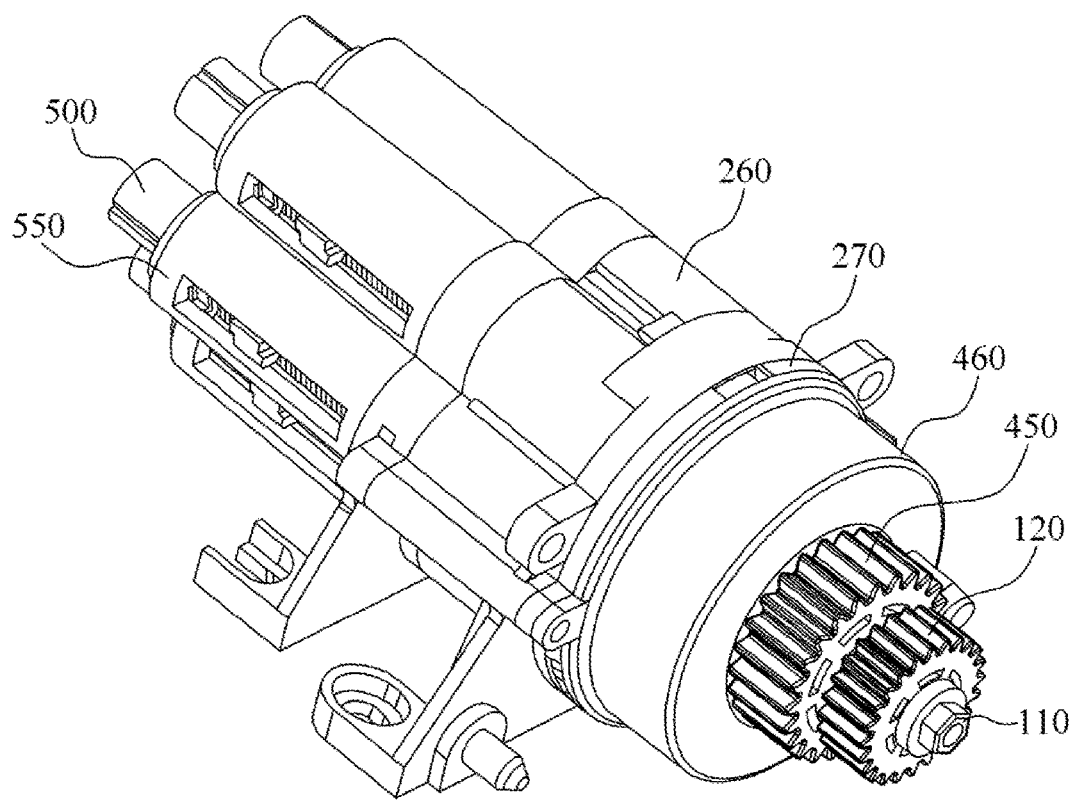
FIG. 1 is a perspective view of a multi-drive apparatus for phase shifters according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used to represent like elements.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. Certain embodiments of the invention are described below in more detail with reference to the accompanying drawings.

The present invention relates to a multi-drive apparatus for phase shifters with which a simple structure is used to drive multiple phase shifters efficiently. For example, an embodiment of the invention can be used to efficiently drive the multiple phase shifters employed in a base station antenna.

According to an embodiment of the invention, the multi-drive apparatus can selectively drive a desired phase shifter from among a multiple number of phase shifters, using just two motors mounted therein.

Figure 2:
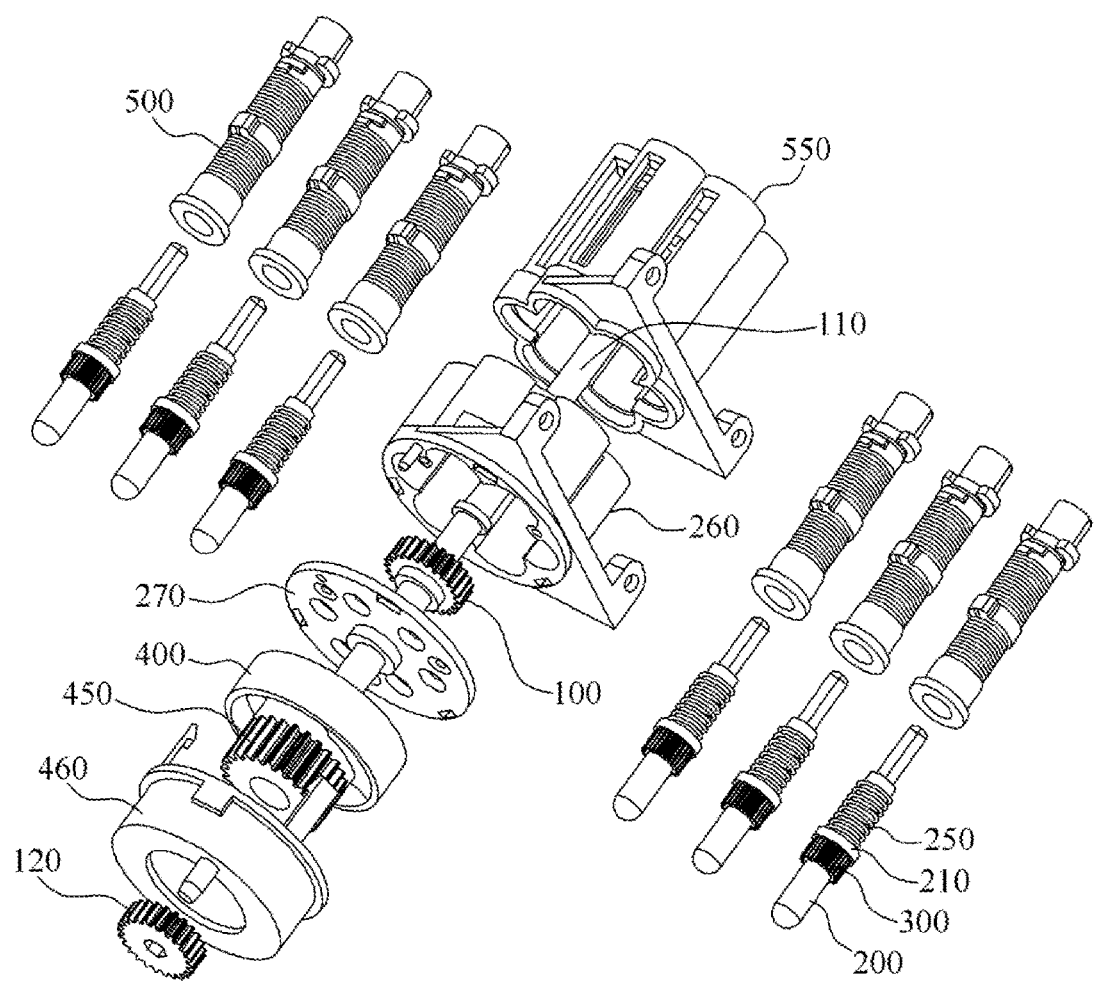
FIG. 2 is an exploded perspective view of a multi-drive apparatus for phase shifters according to an embodiment of the invention.

FIG. 1 is a perspective view of a multi-drive apparatus for phase shifters according to an embodiment of the invention, and FIG. 2 is an exploded perspective view of a multi-drive apparatus for phase shifters according to an embodiment of the invention.

Referring to FIG. 1 and FIG. 2, a multi-drive apparatus for phase shifters according to an embodiment of the invention can mainly include a main-axle gear 100, output shafts 200, output gears 300, and a cam part 400.

The main-axle gear 100 is a gear that transfers the power for changing the phase of a phase shifter and can be coupled with the input shaft 110. The input shaft 110 may penetrate through a center portion of the multi-drive apparatus for phase shifters according to an embodiment of the invention, and a main gear 120 may be coupled to the input shaft 110. Thus, by way of the rotating of the main gear 120, the main-axle gear 100 can also be rotated.

An output shaft 200 may have an output gear 300 coupled thereto, such that the output shaft 200 may be rotated according to the rotation of the output gear 300. The output shaft 200 may be connected to a driven axle 500 and thus connected to a respective phase shifter. An elastic element 250 can be mounted on the output shaft 200. The elastic element 250 may provide an elastic force that allows the output shaft 200 to move. Also, for a stable coupling and securing of the output shafts 200, a shaft housing 260 and a shaft cover 270 can be implemented. In addition, a driven axle housing 550 can also be implemented for a stable coupling of the driven axles 500. The number of output shafts 200 can vary according to the number of phase shifters used, and the present invention is not limited to a particular number of output shafts 200.

The output gear 300 may be shaped to allow an engaging with the main-axle gear 100 and may be secured to the output shaft 200 to rotate together with the output shaft 200.

The cam part 400 may be coupled to a lower part of the output shafts 200, with the output shafts 200 arranged on an upper surface of the cam part 400. The input shaft 110 may penetrate through a center of the cam part 400. A cam gear 450 can be coupled with the cam part 400, such that the cam part 400 is able to rotate according to the rotation of the cam gear 450. A cam housing 460 can be coupled with the cam part 400.

Figure 3:
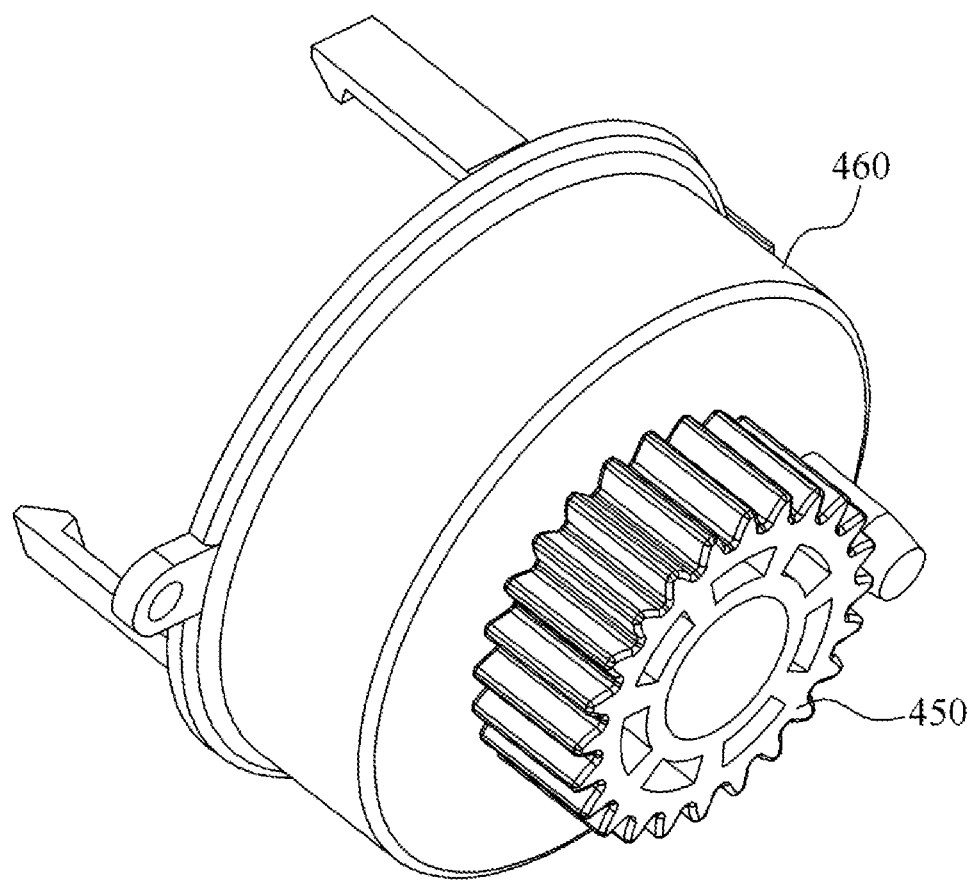
FIG. 3 is a perspective view of the cam part of a multi-drive apparatus for phase shifters according to an embodiment of the invention.
Figure 4:
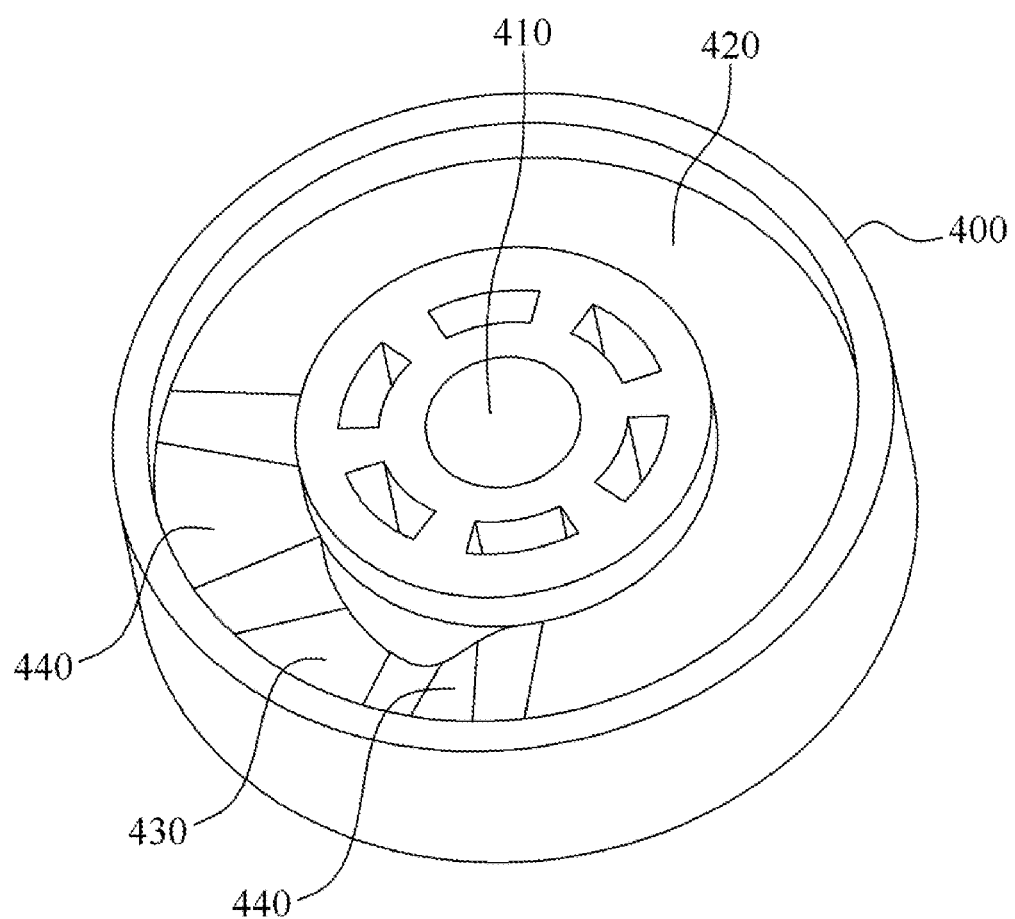
FIG. 4 is a diagram of the cam part of a multi-drive apparatus for phase shifters according to an embodiment of the invention, illustrated such that the inside of the cam part is shown.

FIG. 3 is a perspective view of the cam part of a multi-drive apparatus for phase shifters according to an embodiment of the invention, and FIG. 4 is a diagram of the cam part of a multi-drive apparatus for phase shifters according to an embodiment of the invention illustrated such that the inside of the cam part is shown.

Referring to FIG. 3 and FIG. 4, the cam part 400 can be coupled to the cam housing 460 and can be rotated according to the rotation of the cam gear 450. The cam part 400 can have a cylindrical shape and can have a hole formed such that the input shaft 110 penetrates through the center. The output shafts 200 may be arranged over the upper surface 420 of the cam part 400. At least one recess 430 can be formed in the upper surface 420 of the cam part 400, and inclined portions 440 can be formed which smoothly connects the recess 430 with the upper surface 420. The number of recesses 430 can vary according to the number of phase shifters that are to be operated simultaneously by a multi-drive apparatus for phase shifters according to an embodiment of the invention.

Figure 5:
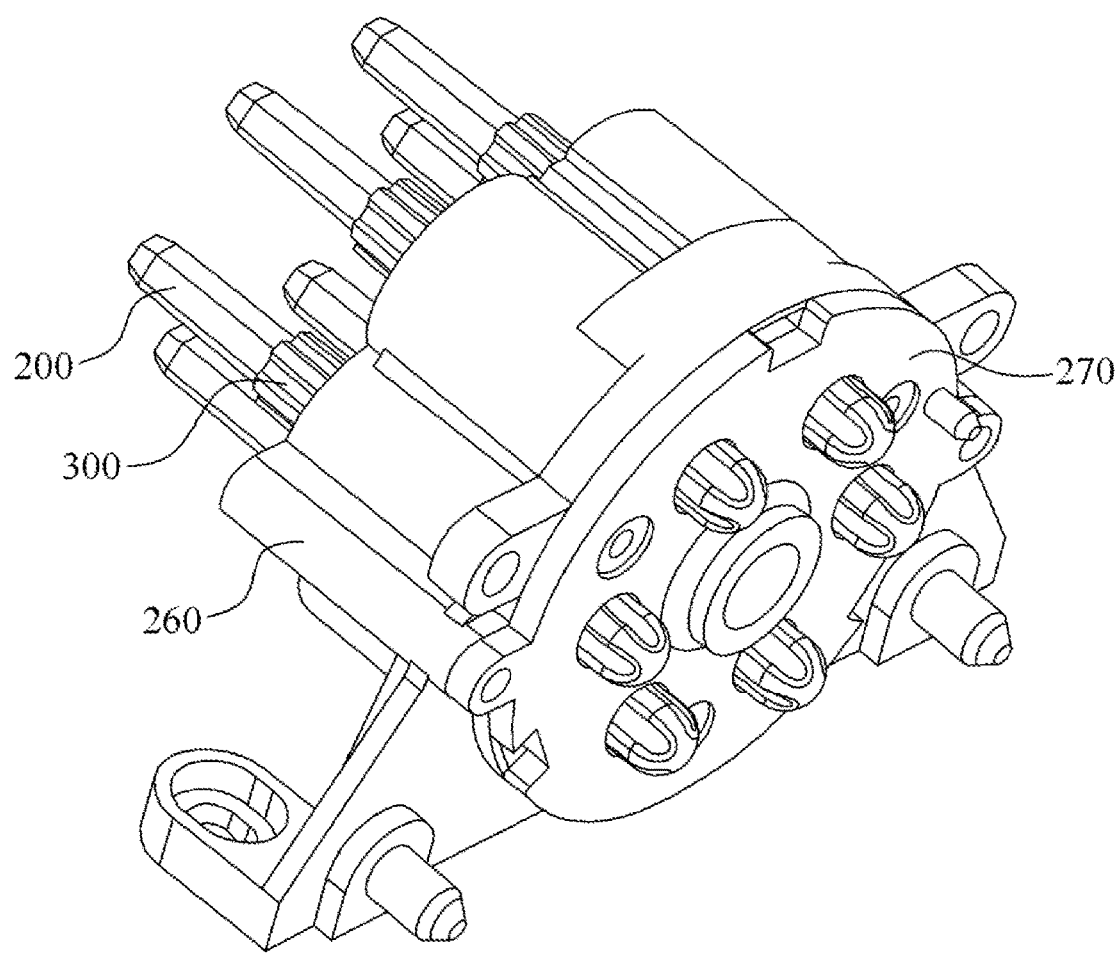
FIG. 5 is a diagram showing only the output shaft portions of a multi-drive apparatus for phase shifters according to an embodiment of the invention.

FIG. 5 is a diagram showing only the output shaft portions of a multi-drive apparatus for phase shifters according to an embodiment of the invention.

Referring to FIG. 5, the output shafts 200 can be coupled with the shaft housing 260 and the shaft cover 270. One end of an output shaft 200 can penetrate through the shaft cover 270 to contact the cam part 400 and can have a spherical shape for minimum friction. The other end of the output shaft 200 can be inserted into a driven axle 500 and can have a polygonal shape such that the rotation of the output shaft 200 may drive the driven axle 500.

Inside a driven axle 500, a shaft nut can be mounted for coupling with the output shaft 200. The inner cross-section of the shaft nut can correspond to the polygonal shape of the outer end of the output shaft 200. The output shaft 200 can be inserted into the shaft nut, and as the output shaft 200 rotates, the shaft nut can perform a translational movement along an up/down direction. Inside the driven axle 500, a first protrusion and a second protrusion can be formed, with the shaft nut configured to undergo a translational movement only between the first protrusion and second protrusion. When the shaft nut presses against the first protrusion or the second protrusion according to the rotation of the output shaft 200, then the output shaft 200 can be prevented from further rotating in the same direction. In this way, the driven axle 500 can prevent the output shaft 200 from continuously rotating in one direction.

A more detailed description is provided below on a method of operating a multi-drive apparatus for phase shifters according to an embodiment of the invention.

Figure 6:
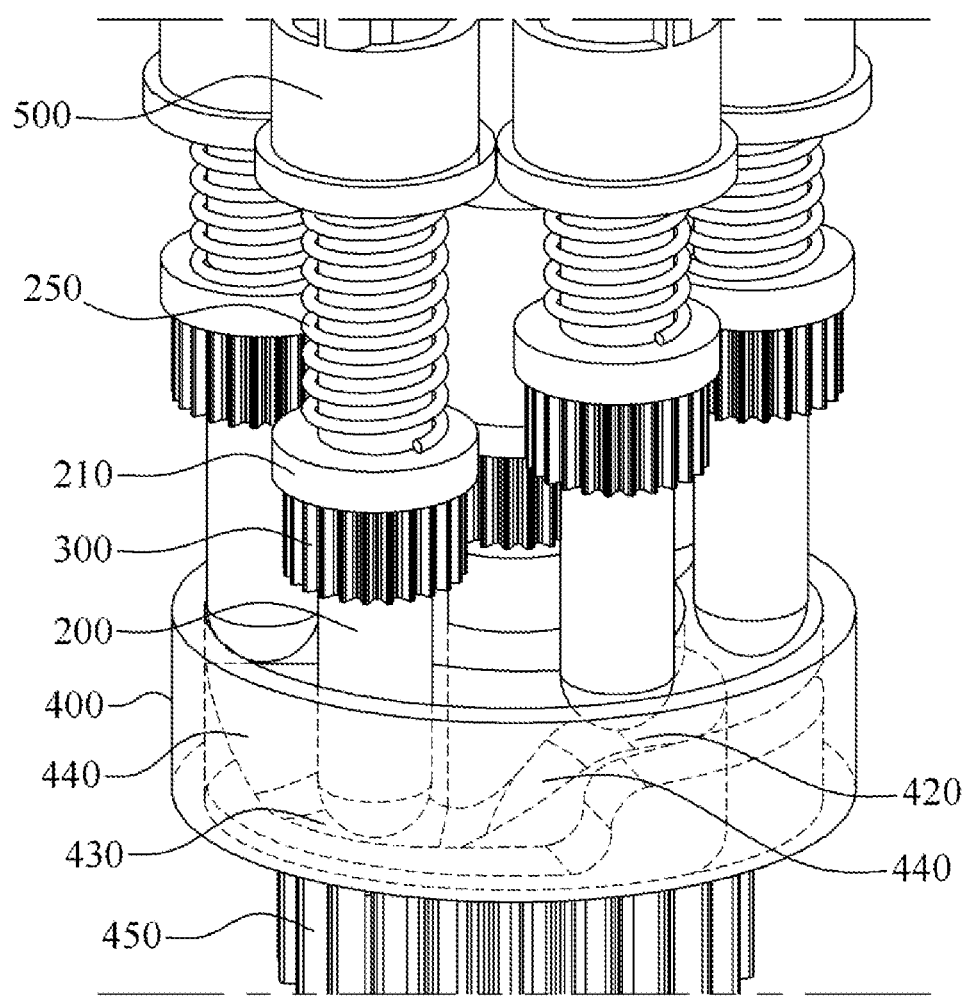
FIG. 6 is a diagram showing an engaging of the main-axle gear and an output gear in a multi-drive apparatus for phase shifters according to an embodiment of the invention.
Figure 7:
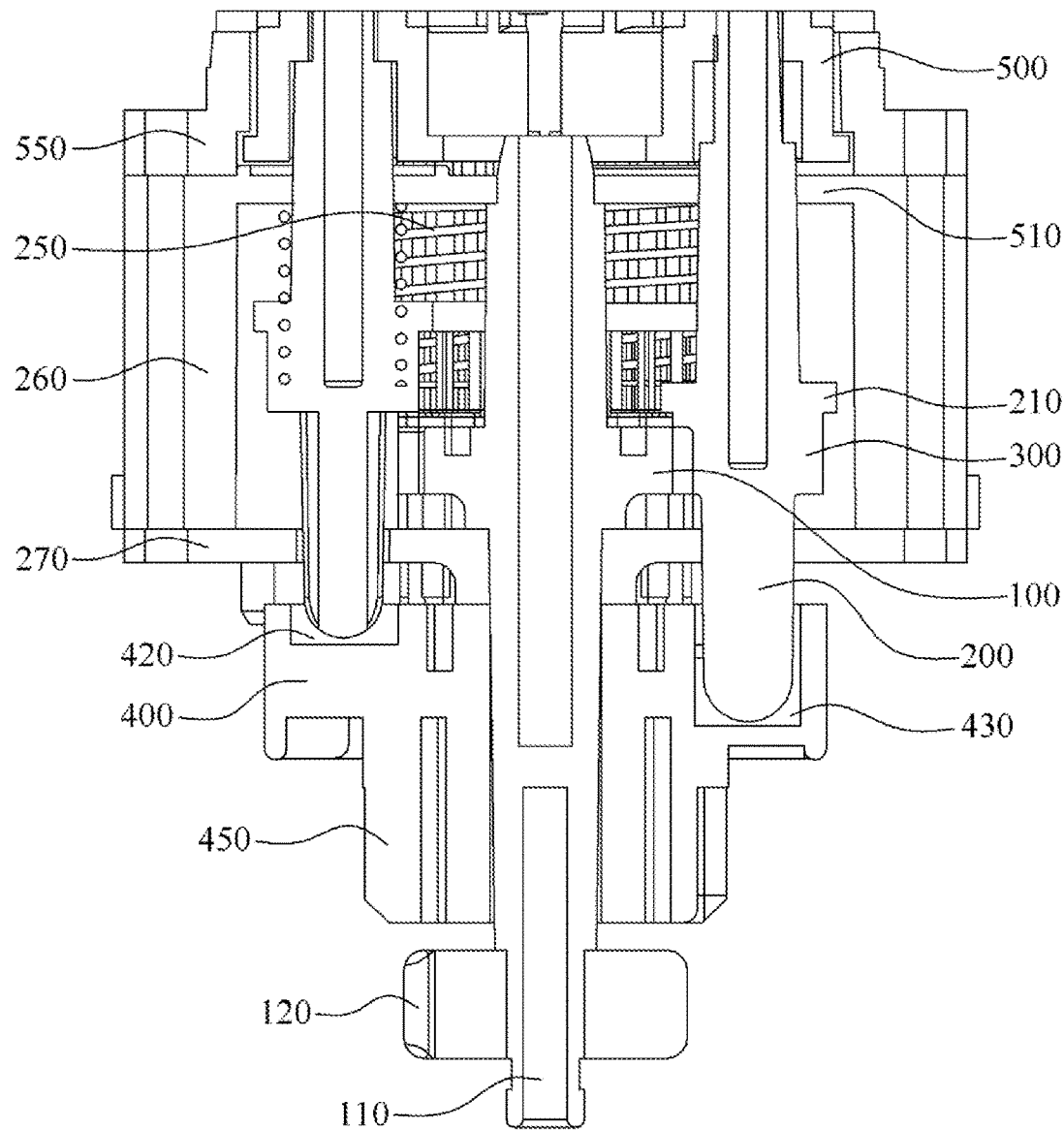
FIG. 7 is a cross-sectional view showing an engaging of the main-axle gear and an output gear in a multi-drive apparatus for phase shifters according to an embodiment of the invention.

FIG. 6 is a diagram showing an engaging of the main-axle gear and an output gear in a multi-drive apparatus for phase shifters according to an embodiment of the invention, and FIG. 7 is a cross-sectional view showing an engaging of the main-axle gear and an output gear in a multi-drive apparatus for phase shifters according to an embodiment of the invention.

Referring to FIG. 6 and FIG. 7, the output shafts 200 may be arranged on the upper surface 420 of the cam part 400. One end of an output shaft 200 can contact the cam part 400 and can have a spherical shape in order to minimize friction during the rotation of the cam part 400. On the other hand, the other end of the output shaft 200 can be inserted into a driven axle 500, and a first support part 510 can be formed in the shaft housing 260. Also, on the output shaft 200, a second support part 210 can be formed, where an elastic element 250 can be mounted between the first support part 510 and the second support part 210. The elastic element 250 may continuously provide an elastic force.

The output gear 300 can be coupled to a lower part of the second support part 210 of the output shaft 200, while the main-axle gear 100 can be coupled to the input shaft 110 that penetrates through the center of the cam part 400, where the output gear 300 can be positioned higher than the main-axle gear 100.

The upper surface 420 of the cam part 400 can have at least one recess 430 formed therein. The depth of a recess 430 can be equal to the height difference between the output gear 300 and the main-axle gear 100. When the cam gear 450 is operated, the cam part 400 may rotate, and when an output shaft 200 is positioned in the recess 430 in accordance to the rotation of the cam part 400, the output shaft 200 may be moved downward by the elastic force of the elastic element 250. Since the depth of the recess 430 may be equal to the difference in height between the output gear 300 and the main-axle gear 100, the output gear 300 of the output shaft 200 that has moved downward may be positioned at the same height as the main-axle gear 100 and thus may engage the main-axle gear 100. Now, when the main gear 120 is driven, the main-axle gear 100, which is connected with the main gear 120 by way of the input shaft 110, may also rotate, in turn causing the output gear 300 that has engaged the main-axle gear 100 to rotate as well. Thus, after the cam gear 450 is driven such that the output shaft 200 connected to the desired phase shifter is moved downwards, the main gear 120 can be driven to drive the desired phase shifter.

Also, inclined portions 440 can be formed in the upper surface 420 in the portions connecting to the recess 430. Due to the inclined portions 440, the output shafts 200 can be smoothly inserted into and retracted from the recess 430 as the cam part 400 is rotated.

It may occur that, even though a particular output shaft 200 is positioned in the recess 430 by the rotating of the cam part 400, the corresponding output gear 300 may not properly engage the main-axle gear 100. If the cogs of the main-axle gear 100 and of the output gear 300 are overlapped and thus are not in a position that allows proper engaging, it may occur that the output shaft cannot move downward into the recess 430 even though the output shaft 200 is positioned over the recess 430. In such a case where the cogs of the main-axle gear 100 and output gear 300 are overlapped and not engaged with each other, the elastic element 250 may continuously provide an elastic force, so that when the main-axle gear 100 begins to rotate and the main-axle gear 100 and the output gear 300 are put in a position that allows engagement, the output shaft 200 may be moved downwards immediately by the elastic force exerted by the elastic element 250, resulting in the corresponding output gear 300 engaging the main-axle gear 100. Also, since the output shaft 200 is moved downwards using the elastic force of the elastic element 250, if the cogs of the main-axle gear 100 and output gear 300 are overlapped and cannot engage each other, the output shaft 200 may not move downwards with excessive force and may wait until the cogs of the main-axle gear 100 and output gear 300 can engage each other, thus preventing damage to the gears.

Once the phase change is completed for a desired phase shifter, the cam gear 450 can be driven for driving another phase shifter. When the cam part 400 is rotated, the output shaft 200 that was positioned within the recess 430 may pass over the inclined portion 440 and onto the upper surface 420, and at the same time, may move upwards along the upper surface 420 of the cam part 400, so that its corresponding output gear 300 may no longer engage the main-axle gear 100. The cam part 400 can then be rotated to drive another selected phase shifter according to the method described above.

The number, size, and position of the recess 430 formed in the cam part 400 can be altered in various ways according to the desired number of phase shifters that are to be driven at once. Therefore, depending on the number, size, and position of the recesses 430, it is also possible to have two or more output shafts 200 move down simultaneously.

A multi-drive apparatus for phase shifters according to an embodiment of the invention can drive the main gear 120 and cam gear 450 to efficiently adjust the phase of multiple phase shifters by utilizing a simple structure as described above. A multi-drive apparatus for phase shifters according to an embodiment of the invention requires only two motors for driving the main gear 120 and the cam gear 450 regardless of the number of phase shifters and thus can reduce costs as well the volume of the antenna it is used in.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A multi-drive apparatus for phase shifters, the multi-drive apparatus comprising:
   a main-axle gear;
   a plurality of output shafts each connected to a phase shifter;
   a plurality of output gears coupled with the output shafts; and
   a cam part having the output shafts arranged on an upper surface thereof,
   wherein at least one recess is formed in the upper surface of the cam part,
   and when at least one of the output shafts is inserted into the recess according to a movement of the cam part, then an output gear coupled with the output shaft inserted into the recess engages the main-axle gear.

2. The multi-drive apparatus for phase shifters of claim 1, further comprising:
a first support part positioned above the output gears,
wherein each of the output shafts have a second support part formed thereon, elastic elements are mounted on the output shafts, the elastic elements mounted between the first support part and the second support parts,
and the elastic elements are mounted in a compressed state so as to provide elastic forces for enabling each output shaft to be inserted into the recess when positioned over the recess.

3. The multi-drive apparatus for phase shifters of claim 1, wherein the recess comprises an inclined portion, and when an output shaft is inserted into and retracted from the recess, then the output shaft is smoothly inserted and retracted by way of the inclined portion.

4. The multi-drive apparatus for phase shifters of claim 1, further comprising:
an input shaft penetrating through the cam part,
wherein the main-axle gear is coupled with the input shaft such that the main-axle gear rotates in accordance with a rotation of the input shaft.

5. The multi-drive apparatus for phase shifters of claim 1, wherein a distal end of an output shaft contacting the cam part has a spherical shape so as to minimize friction.

6. The multi-drive apparatus for phase shifters of claim 1, wherein a rotation of the main-axle gear causes the engaged output gear to rotate accordingly, a corresponding output shaft rotates in response to a rotation of the output gear, and a phase of a phase shifter having the output shaft connected thereto is changed according to a rotation of the output shaft.

7. The multi-drive apparatus for phase shifters of claim 1, wherein the output gears all engage the main-axle gear when the output gears and the main-axle gear are arranged on a same plane.

8. The multi-drive apparatus for phase shifters of claim 1, wherein none of the output gears engage the main-axle gear when the output gears are arranged on a same plane but the main-axle gear is not arranged on the same plane as the output gears.

9. The multi-drive apparatus for phase shifters of claim 2, wherein an elastic member mounted on at least one of the output shafts positioned over the recess provides an elastic force continuously to enable the at least one output shaft to engage the main-axle gear, if the at least one output shaft is positioned over the recess but is not engaged with the main-axle gear.

10. The multi-drive apparatus for phase shifters of claim 1, further comprising:
driven axles configured to drive the phase shifters respectively,
wherein the output shafts are inserted in the driven axles respectively, the output shafts have polygonal cross-sections at distal ends thereof, the distal ends configured for insertion into the driven axles, and the driven axle is driven by a rotation of the output shaft.

11. The multi-drive apparatus for phase shifters of claim 10, further comprising:
a shaft nut mounted inside the driven axle,
wherein the shaft nut is configured to receive the output shaft inserted therein, the shaft nut having at least one protrusion formed on an inside thereof, the shaft nut undergoes a translational motion according to a rotation of the output shaft, and the output shaft is unable to further rotate in one direction if the shaft nut contacts the at least one protrusion as the output shaft rotates in said one direction.

* * * * *